US010200478B1

(12) United States Patent
Franke et al.

(10) Patent No.: US 10,200,478 B1
(45) Date of Patent: Feb. 5, 2019

(54) SYSTEMS AND METHODS FOR PREDICTIVE LOGINS TO SESSION(S) OR RESOURCE(S)

(71) Applicant: Dell Software Inc., Aliso Viejo, CA (US)

(72) Inventors: Michael Franke, Trabuco Canyon, CA (US); Michael McDonald, Herndon, VA (US); Marc Edward Zapf, Stone Ridge, VA (US)

(73) Assignee: Dell Software Inc., Aliso Viejo, CA (US)

( * ) Notice: Subject to any disclaimer, the term of this patent is extended or adjusted under 35 U.S.C. 154(b) by 1219 days.

(21) Appl. No.: 13/970,155

(22) Filed: Aug. 19, 2013

(51) Int. Cl.
*H04L 29/08* (2006.01)

(52) U.S. Cl.
CPC .................. *H04L 67/14* (2013.01)

(58) Field of Classification Search
CPC ...................................... H04L 63/08
USPC .............................. 709/225, 227
See application file for complete search history.

(56) References Cited

U.S. PATENT DOCUMENTS

| | | | |
|---|---|---|---|
| 6,879,997 B1 * | 4/2005 | Ketola | H04W 4/12 455/517 |
| 7,328,263 B1 * | 2/2008 | Sadjadi | G06F 9/526 707/999.008 |
| 7,475,422 B1 * | 1/2009 | Bull | G06Q 10/107 709/204 |
| 7,765,279 B1 * | 7/2010 | Kaib | G06F 17/30867 705/35 |
| 8,255,984 B1 | 8/2012 | Ghostine et al. | |
| 8,296,262 B1 | 10/2012 | Ellis, III | |
| 2004/0015547 A1 * | 1/2004 | Griffin | H04L 12/1827 709/204 |
| 2006/0013229 A1 * | 1/2006 | Johansson | H04L 12/5695 370/395.41 |
| 2008/0307525 A1 | 12/2008 | Nickle | |
| 2010/0153506 A1 * | 6/2010 | Lim | G06Q 10/10 709/206 |
| 2013/0006897 A1 | 1/2013 | Jain et al. | |

OTHER PUBLICATIONS

U.S. Appl. No. 13/804,064, King-Britton.

* cited by examiner

*Primary Examiner* — Liang Che A Wang
*Assistant Examiner* — Sherman Lin
(74) *Attorney, Agent, or Firm* — Winstead PC

(57) ABSTRACT

Systems and methods for pre-login of user(s) to sessions or resources in an information handling system are disclosed. A method for pre-login may include the steps of determining if any users are to be pre-logged on to a session or resource within a select period of time from a current time, and counting the number of users to be pre-logged on. A pre-login time for the users may be calculated and scheduled, and the users may be pre-logged on to the session or resource at the pre-login time.

20 Claims, 3 Drawing Sheets

SYSTEMS AND METHODS FOR PREDICTIVE LOGINS TO SESSION(S) OR RESOURCE(S)

FIELD OF THE INVENTION

The present invention relates generally to reducing user login times and more particularly, but not by way of limitation, to systems and methods for predictive logins to session(s) or resource(s) to reduce user login times.

BACKGROUND OF INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHS) may require a user to login to a session or resource, which may take a significant amount of time. For example, a user may be required to login to a network, operating system, application, server, client or the like. Long logon times affect user productivity. Login time may be consumed with initializing, loading, setup and/or allocation of sessions or resources. For example, login time may be consumed by loading an operating system environment, mapping hardware, and initializing applications. In some cases, users may logon to the IHS in shifts due to their work schedule, which may create a significant load on the IHS at the beginning of a shift. Furthermore, the IHS should be designed to carry this peak load. These long login times and multiple simultaneous login attempts may affect both user productivity and load on the IHS.

SUMMARY OF THE INVENTION

In one embodiment, a method for pre-login to sessions or resources includes determined a number of users to be pre-logged in within a select period of time from a current time, and calculating and scheduling a pre-login time for the users(s). A set lead time may be added in to the pre-login time. The user(s) is pre-logged in to session(s) or resource(s) at the pre-login time calculated. In some embodiments, a session or resource may be an operating system (OS), network, application, server, client, or the like.

In another embodiment, an information handling system for pre-logging in users includes a server that provides pre-login software. The server may provide a database for storing a pre-login data for one or more users, such as pre-login times for user(s). The server may also provide a storage device for storing session or resource initialization data, which is utilized to pre-login a user to a session or resource. The server may provide a password broker for storing user identification and password information and a processor for performing various instructions.

In yet another embodiment, the pre-login systems and methods may provide a predictive, manual, self-service, and/or integrated pre-login modes. In a predictive mode, users may be pre-logged in to sessions or resources based on predictive analysis of a user's logon patterns. In a manual mode, a user may be pre-logged in to sessions or resources based on a schedule set by an administrator. In a self-service mode, users may set their own pre-login schedule. In an integrated mode, pre-login schedules defining when a user is to be pre-logged in to a session or resource are provided from an external source, such as a standard interface from a staff scheduling system.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
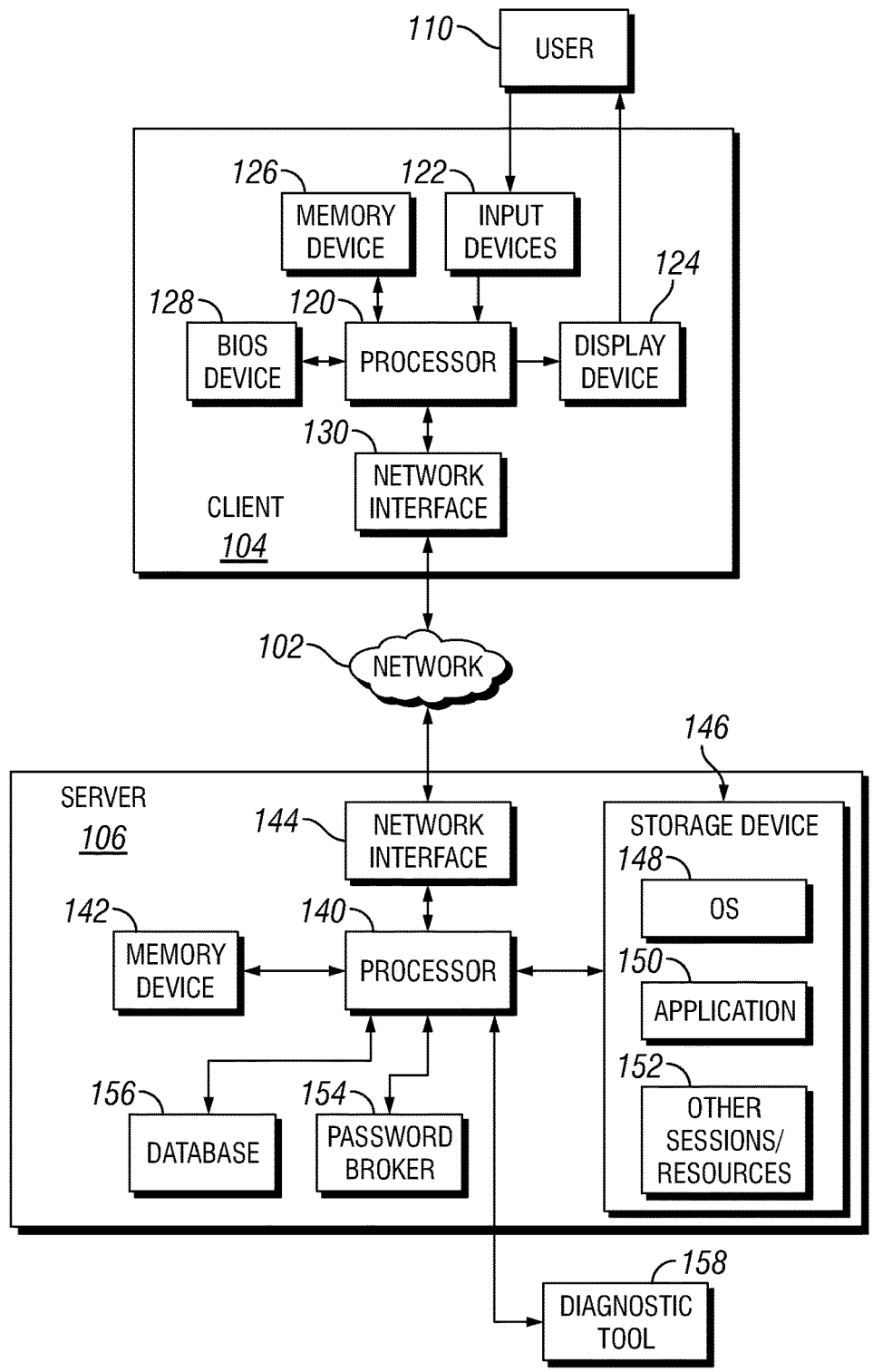
FIG. 1 is an illustrative embodiment of a pre-login system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In various embodiments, systems and methods discussed herein may provide pre-login(s) to reduce user login time. The systems and methods may provide pre-login(s) to sessions or resources, such as networks, operating systems, applications, servers, clients and/or the like.

In various embodiments, a system may provide a network that allows one or more clients to be coupled to one or more servers. The network may be any suitable network, such as a LAN, WAN, TCP/IP network, or the like. The client may be any suitable client, such as a personal computer, desktop, laptop, tablet, mobile device, smart phone, personal digital assistant, or the like. The server may be any suitable server, such as an applications server, boot server, network server, or the like. In a nonlimiting embodiment, the server may provide session, resource, application, and/or operating system support in the network.

An information handling system, such as a system including networks, servers, storage, application, etc., may encounter heavy peak loads during certain times. For example, multiple user may login or logon to the system at a certain time of the day when arriving at work, which creates a heavy peak load on a system. The entire system must be to handle the peak load. Heavy loads may create long login times and affects productivity of a user. Further, in some environments, users may frequently move from station-to-station during the day, and the user may be required to login repeatedly to different stations throughout the day. Login times may be consumed with loading an operating system environment; mapping drives, printers or the like; loading application; or the like. Therefore, it would be beneficial to provide a system that can pre-login users to session(s) or resource(s) to reduce login time.

In the various embodiments of systems and methods discussed herein, pre-login may be provided to reduce login times. Pre-login refers to allocating session(s) or resource(s) for a user by preparing a system or a portion of a system for a specific user at a predetermined time prior to the user's actual login time. As a nonlimiting example, prior to a user arriving at work, pre-login may setup, allocate and/or load pre-login sessions or resources including, but not limited to, loading an operating system, mapping drives and printers, loading applications, allocating hardware or a combination thereof. Once the allocation of sessions or resources is complete, the sessions or resources are held in an idle mode until the user actually logs on or timeout occurs. If the user does not login within a predetermined time, timeout may occur and the user may be automatically logged off. When the user logs in within the predetermined time, logon time is reduced because the session(s) or resource(s) (e.g. operating system, application, and the like) is already loaded and the drives and printers are already mapped. As used herein, sessions or pre-login sessions refers to an interactive information interchange between two or more communicating devices, or between a computer and user. Resources or pre-login resources refers to any software or hardware loaded or allocated during a login process, such as operating systems, applications, servers, drives, printers, etc. It should be recognized that a session may include the allocation of one or more resources. Further, any discussion of pre-login to a session provided herein is equally applicable to pre-login to a resource and vice versa.

In some embodiments, pre-login may be provided using predictive, manual, self-service, or integrated modes. A predictive mode may be based on user login pattern analysis. Diagnostic tools (e.g. Desktop Authority Management Suite or Foglight™ for Virtual Desktops (F4Vd)) that monitor users may gather data that can be analyze to intelligently determine when a user is likely to login to a pre-login session or resource. Accordingly, the user may be automatically pre-logged in to load the session or resource prior to the anticipated login time determined by pattern analysis. Any suitable algorithm may be utilized for pattern recognition to intelligently predict user login times.

A manual mode may allow an administrator to define a pre-login schedule for users. For example, the administrator may enter pre-login times and session(s)/resource(s) to be pre-logged in to at the specified pre-login time for one or more users. A self-service mode may allow a user to configure their pre-login schedule. For example, each user may specify a pre-login schedule, such as the session(s)/resource(s) to be pre-logged in to and a pre-login time for session(s)/resource(s). An integrated mode may allow interface with a scheduling system using standard interfaces, such as Health Level Seven (HL7). For example, an external staff scheduling system may provide scheduling information through an interface, such as a HL7 interface, that allows pre-login schedules for one or more users to be set up in accordance with staff schedules specified by the external staff scheduling system.

FIG. 1 is an illustrative implementation of an information handling system that provides pre-login to session(s) or resource(s) to reduce user login time. A client 104 may be coupled to a network 102 that is also coupled to a server 106. In other embodiments, a user 110 may login directly to a server; thus, a client and network are not essential to the pre-login systems and methods discussed herein. Client 104 may provide a processor 120 coupled to input devices 122, display device 124, memory device 126, Basic Input/Output System (BIOS) device 128, and network interface 130. Processor 120 executes instructions. Input devices 122 may be any suitable input devices, such as keyboards, mouses, touchscreens, trackballs, trackpads, or the like. Display device 124 may be any display suitable for presenting information to the user 110, such as a LCD, plasma display, CRT display, or the like. Memory device 126 provides storage for client 104. BIOS device 128 may provide basic initialization and support instructions for client 104. Network interface 130 allows data to be transmitted from or to client 104.

Server 106 may provide a processor 140 coupled to a memory device 142, network interface 144, storage device 146, password broker 154, database 156, and diagnostic tool 158. Memory device 142 provides storage for server 106, and network interface 144 allows data to be transmitted from or to server 106. Storage device 146 may store session or resource initialization data for allocating/loading/setting up pre-login sessions, resources, initializing/booting clients, loading operating systems/application, mapping drives/printers, or the like. Storage device 146 may include OS storage 148, application storage 150, and other session/resource storage 152. For example, data for initializing and loading Windows and Outlook may be retrieved from OS storage 148 and application storage 150, respectively, to pre-login a user. When the user logs in, Windows and Outlook have already been initialized and loaded so the user does not need to wait for them to be initialized and loaded. Further discussion of log on processes can be found in U.S. Pat. No. 8,255,984 filed Jul. 1, 2010 and U.S. patent application Ser. No. 13/804,064 filed Mar. 14, 2013, which are hereby fully incorporated by reference.

Password broker 154 may store user identification and password data. For example, password broker 154 may capture user passwords for users that are defined in a whitelist. The password broker 154 may capture and store (encrypted) current password for a successful logon. Database 156 may store pre-login data for one or more users. For example, pre-login data may specify pre-login times and a corresponding pre-login session/resource to be pre-logged into for one or more users. Diagnostic tool 158 may gather user pattern data on user login patterns that may be utilized for predictive login, such as a username, date/time user logged on, login frequency, session or resource accessed (e.g. OS, application, server, silo, or the like), and the like. For example, a diagnostic tool 158 such as Foglight™ for Virtual Desktops may capture such user pattern data. While diagnostic tool 158 is shown as being separate from server 106, in other embodiments, the diagnostic tool may be incorporated to the server.

Pre-login software provided on a server 106 may be utilized to pre-logon users to pre-login session(s), resource(s), network(s), operating system(s), application(s), server(s), client(s), or a combination thereof. Server 106 is may be a standalone server or clusterable server. User data may be gathered or provided in accordance with one of the pre-login modes discussed above. In a predictive mode, user data from diagnostic tool 158, such as a typical login time and session(s)/resource(s) accessed, may be analyzed to determine pre-login information, such as desired login time and resource to be pre-logged in. In other modes, the pre-login information may be provided by a user/administrator or transmitted to server 106 from an external source. Using the pre-login information (e.g. desired login time and session/resource to be pre-logged into), a pre-login time may be calculated. Pre-login time may be based on several factors including, but not limited to, the current time, the number of users to be logged in, number of allowed simultaneous logins for a session/resource, desired lead time, and the like. For example, either through predictive analysis of user data or through information provided by a user, administrator, or external source, it may be determined that the user frequently logs on at 8 am when arriving at work to initialize and load an operating system, such as Windows, and immediately loads an application, such as Outlook. As a result, the pre-login system may determine that it is desirable to pre-login the user to Windows and Outlook at a predetermined pre-login time prior to 8 am.

In accordance with one of the pre-login modes discussed above, pre-login information (e.g. desired login time and session or resource to be logged into) for user(s) is provided to a pre-login system. In a nonlimiting example, a pre-login time may be determined by considering the time needed to login to the session/resource, number of users to be logged in, and maximum number of simultaneous logins allowed for the session/resource. In some embodiments, it may be desirable to add in a predetermined lead time. As the pre-login time for a user approaches, session/resource initialization data may be retrieved from storage 146. Further, user identification and password information stored in password broker 154 may also be utilized to pre-login the user to a desired pre-login session/resource prior to the desired login time. By pre-logging in the user to the pre-login session/resource, the user can be directly connected to the pre-login session/resource at the desired login time without having to wait for the session/resource to be loaded, initialized, or setup.

Figure 2:
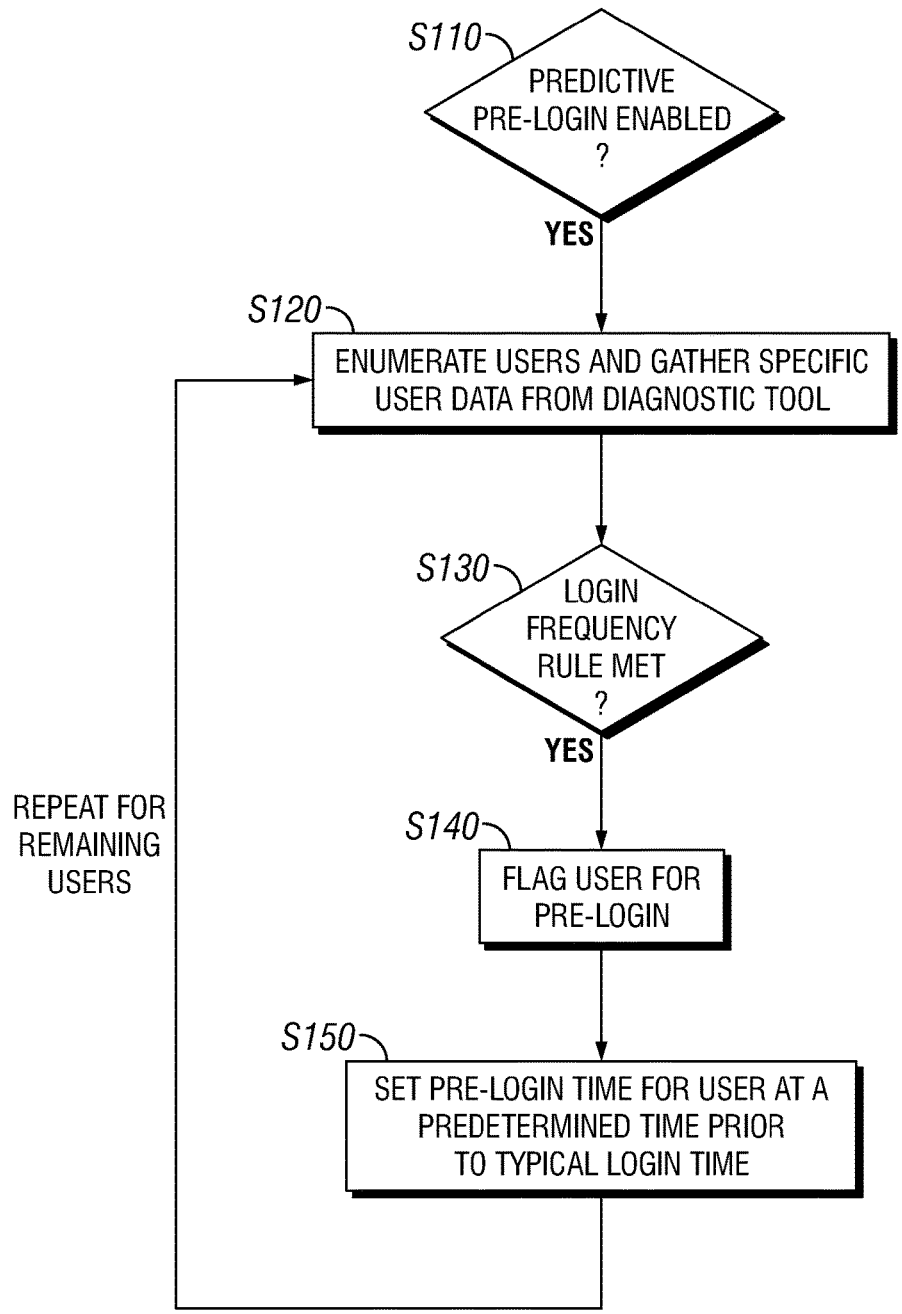
FIG. 2 is an illustrative embodiment of a flow chart illustrating a pre-login predictive analysis process.

FIG. 2 is a flow chart illustrating a pre-login pattern analysis process. How often and when to analyze user pre-logon patterns may be set by an administrator, e.g. nightly, weekly, monthly, etc. A check may be performed in step S110 to determine if predictive pre-logon is enabled. If predictive pre-login is enabled, the number of users specified for a predictive pre-login mode is determined, a user is selected, and user data corresponding to the selected user is read in step S120. The selected user's data is analyzed to determine if a minimum frequency value is met in step S130. For example, the minimum frequency value may require several logins at about the same time for a specified time period, e.g. 8 login attempts at approximately the same time for within a period of two weeks. If selected user meets the minimum frequency value, the selected user is flagged for pre-login in step S140. In step S150, a pre-login time for the selected user is set at a predetermined time prior to the desired login time for the selected user. The process may return to step S120 to select a new user and repeat the steps for any remaining users.

For example, an pre-login pattern analysis process using a diagnostic tool, such as, but not limited to, Foglight™ for Virtual Desktops (F4Vd), is provided: Feature enabled (yes)→pre-login enabled (yes)→enumerate users from groups or target assignments (e.g. user1 found)→read database (e.g. F4Vd DB) for user1→has user1 met minimum logon value/frequency rules (yes)→flag user in database for pre-logon-→set pre-logon time in 1 hour increments rounding backwards (e.g. if user normally logs on at 7:58 am every day, pre-logon time would be set to 7:00 am). Repeat for remaining users in database.

Figure 3:
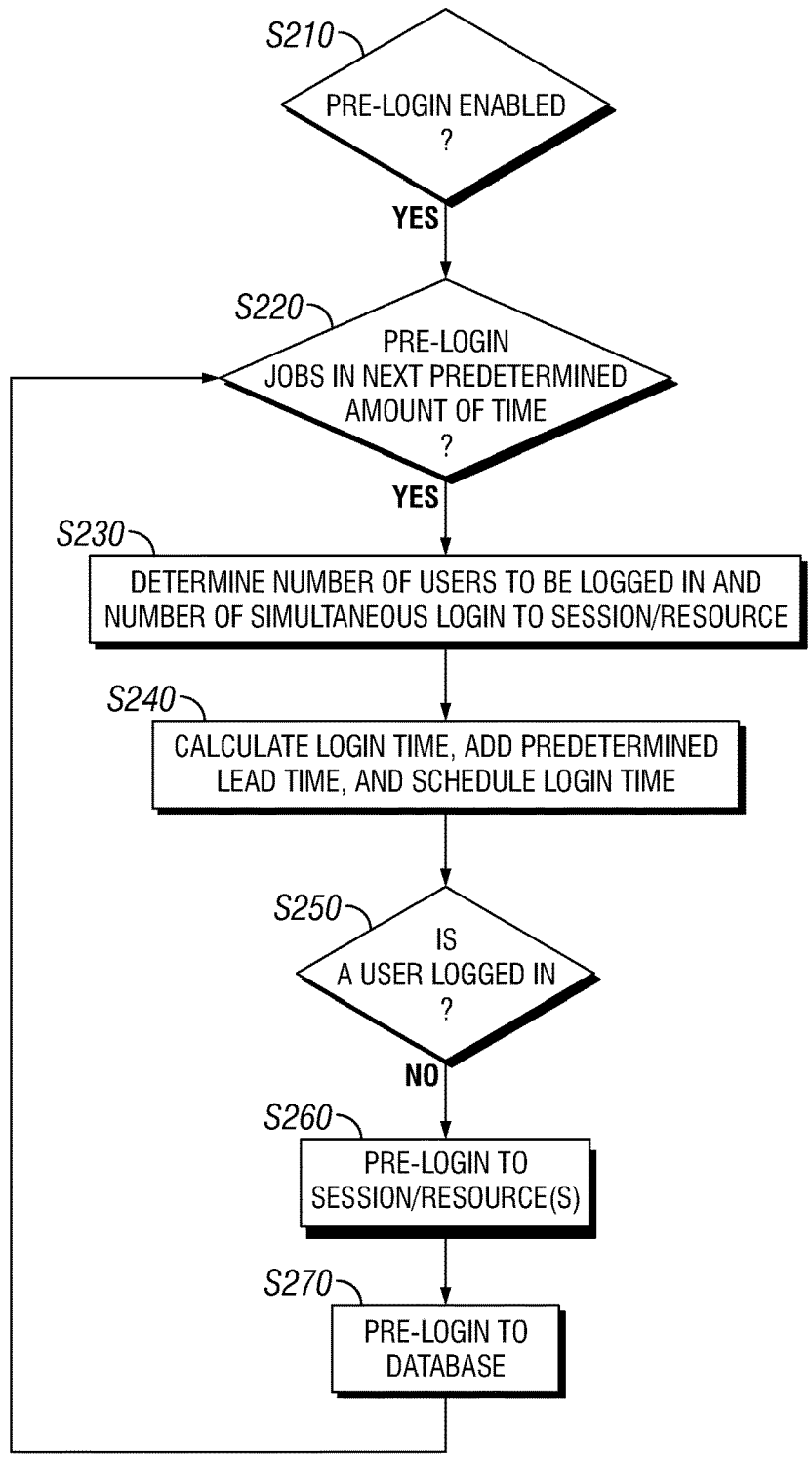
FIG. 3 is an illustrative embodiment of a flow chart illustrating a pre-login run time.

FIG. 3 is a flow chart illustrating a pre-login run time. In S210, a check is made to determine if pre-login features are enabled. When determining a pre-login time, several factors are important, including the number of logons within a defined time window, minimum pre-logon lead time (how far in advance to logon users), and maximum number of users allowed to logon to a single session/resource simultaneously. If pre-login features are enabled, pre-login jobs are analyzed to determine if any jobs are to be performed in next predetermined increment of time in S220. For example, pre-login jobs may be analyzed to determine if any jobs need to be performed in the next hour. If a pre-login job is to occur in the next predetermined increment of time, the total number of users to be logged in for the batch is determined in S230. For example, the total number of pre-login jobs to be performed in the next hour may be determined. In S240, the login time needed for the batch is calculated. The login time needed may be based on the number of user in the batch, the number of simultaneous logins allowed for a session/resource may be considered, and expected login time. For example, an expected login time for a session/resource may require one minute to login. If 100 users are to be logged in and 5 simultaneous logins are allowed, 20 one minute login periods are needed to login all 100 users. Additionally, a predetermined amount of lead time may be added to login time needed, and the login time may be scheduled accordingly in S240. In S250, a check may be made to determine if the user is already logged onto a session/resource prior to pre-login to a session/resource. If not, the user is pre-logged in to a session/resource in S260. The user's login may be logged in S270.

For example, a runtime process using a virtual environment, such as, but not limited to, Foglight™ for Virtual Desktops, is provided for users to be pre-logged in to a virtual workspace: Feature enabled (yes)→will pre-logon job need to be complete within the next n hours? (yes)→how many users need to be pre-logged in, in this batch (100)→how many users can be logged on simultaneously to this resource (5)→calculate logon time (1 minute to login*100 users/5 users simultaneous=20 minutes)→add Lead Time (15 min)→schedule job to start 35 minutes before required pre-logon time→check to see if user1 is already logged onto a resource (no)→pre-logon User1 by establishing remote desktop protocol (RDP) session→disconnect RDP session-→log pre-logon to DB.

Orphaned sessions are pre-login sessions that a user never logs onto after being pre-login to a session or resource. The pre-login system may implement a timeout policy to terminate the pre-login if a user does not login within a predetermined time. For example, in the virtual workspace example discussed above, pre-login sessions could be terminated by automatically leveraging a remote desktop session host (RDSH) disconnect timeout policy set on each server/VM/host.

The pre-login systems and methods may provide several administrative controls. Enable/disable feature allow pre-login and different pre-login modes to be enabled or disabled. Group or user assignment (e.g. white/black list) may indicate whether users may pre-login (e.g. white list) or not (e.g. black list). For example, a pre-login system could leverage an existing tool that provides user grouping and assignments to create user assignments to white or black list. As a nonlimiting example, virtual system, such as F4Vd, could leverage existing tools, such as VWorkspace Target Expressions, to create user assignments to white or black list. Automatic or manual logon time assignment can be set up in accordance with the pre-login modes discussed previously. A run-now option may allow for real-time pattern analysis.

A user interface (UI) may provide an interface that allows administrators or user to operate the pre-login system. For example, the UI may allow manual assignment of users/ groups to pre-logon to sessions or resources, including time selection; and assignments (auto or manual) of users with multiple views, including assigned users, assigned groups, and summaries of scheduled pre-logon events with timetable/volume.

Pre-login systems and methods discussed are equally applicable to virtual and non-virtual systems. The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

In a physical environment, users of an information handling system (IHS), such as physical PCs, can benefit from the system providing pre-logon services. With physical systems, user logon data can be gathered from event logs, Active directory logs and other sources. This data could be used by the system to intelligently pre-determine when a user is likely to logon to a given pre-login to their IHS. In a manner of self-service mode, the user or an administrator could set a pre-login time. In an integrated mode, an external system, such as a staff scheduling system may provide the pre-login time via a standard interface (e.g. HL7). In a predictive mode, user login data from a diagnostic tool (e.g. event logs, active directly logs) would be provided to the pre-login system. The pre-login system would perform a pattern analysis of data gathered from event logs, Active directory logs and other sources to identify users to be pre-logged in and to determine pre-login times.

The pre-login system would use the pre-login data to intelligently pre-logon users to physical IHSs for them before they need them. For example, session or resource initialization data for pre-login to a physical PC may be utilized with a stored user identification and password data to pre-login at a pre-login time. When a user logs on to the PC, the system would be in an idle state, such as a disconnected RDP session logged in state, allowing the users to logon without waiting for logon processes.

Pre-login systems and methods could reduce user logon time by 30 seconds to two minutes per user. In some cases, when users logon multiple times per day (for security reasons), this could save 30 minutes or more per day per user.

In some embodiments, it may be desirable to provide for wake on LAN (WOL) or wake on WAN (WOW) features. Sometimes IHSs will be turned off, and it may be necessary to wake up the IHS before pre-logging it on. WOL allows a computer to be turned on or awakened by a network message. Existing network standards providing WOL may be utilized to allow an IHS, such as a physical PC, to be turned on or awakened by a network message.

Wake on WAN (WOW) also allows a computer to be turned on or awakened by a network message. However, existing network standards do not provide WOW features. For WOW, a system may provide a subnet directed broadcast with a WOL packet payload. Preferably, routers would have the address resolution protocol (ARP) cache set to a very long value, such as three days. This way when the router gets the subnet directed broadcast, the router can translate the IP to MAC and send the wake up packet to the intended target.

In a virtual system, a pre-login system could intelligently pre-determine when a user is likely to logon to a given pre-login session/resource or virtualization session/resource, such as a terminal server or virtual desktop infrastructure (VDI) instance. In a manual mode or self-service mode, the user or an administrator would set a pre-login time. In an integrated mode, an external system, such as a staff scheduling system may provide the pre-login time via a standard interface (e.g. HL7). In a predictive mode, user login data from a diagnostic tool (e.g. F4Vd) would be provided to the pre-login system. The pre-login system would perform a pattern analysis to identify users to be pre-logged in and to determine pre-login times.

The pre-login system would use the pre-login data to intelligently pre-logon users to virtual sessions or resources for them before they need them. For example, session or resource initialization data for pre-login to a terminal server or VDI instance may be utilized with a stored user identification and password data to pre-login at a pre-login time. When a user logs on to the virtualization broker system, such as vWorkspace, the user would be directly connected to the session or resource without waiting for logon processes.

Pre-login systems and methods could reduce user logon time by 30 seconds to two minutes per user. In some cases, in terminal server environments, this could save 30 minutes or more per day per user.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method for pre-login to sessions or resources of an information handling system, the method comprising:

determining if one or more users is to be pre-logged in to a system within a selected period of time from a current time;

counting a number of users to be pre-logged in to the system in said selected period of time;

calculating and scheduling a pre-login time for said one or more users to be pre-logged in to said system within the selected period of time from said current time, wherein a set lead time is included in said pre-login time; and initializing pre-login of said one or more users to said system at said pre-login time, the initializing comprising allocating resources of the system to said one or more users to yield one or more pre-login sessions corresponding to the one or more users;

holding the one or more pre-login sessions in an idle mode at least until certain criteria is satisfied, the certain criteria comprising actual log on to the system by the particular user; and responsive to a particular user of the one or more users logging on to the system, connecting the particular user to a corresponding pre-login session of the one or more pre-login sessions, thereby ending the idle mode of the corresponding pre-login session.

2. The method of claim 1, wherein the allocated resources comprise at least one of an operating system (OS), network, application, server, or client.

3. The method of claim 1, further comprising the step of determining a number of simultaneous logins allowed for said system.

4. The method of claim 3, further comprising dividing said number of users to be pre-logged in by the number of simultaneous logins allowed.

5. The method of claim 1, wherein a desired login time for a user is determined by pattern analysis of past login behavior of said user.

6. The method of claim 1, wherein a target user or an administrator enters a desired login time for said target user.

7. The method of claim 1, wherein a desired login time for a target user is provided by external source.

8. The method of claim 7, wherein the external source is a staff scheduling system.

9. The method of claim 1, further comprising checking if a target user is already logged in to the system prior to pre-login of said target user to the system.

10. The method of claim 1, wherein a target user is timed out of said pre-login session if the user does not login within a set period after said pre-login time.

11. An information handling system comprising:
a server providing pre-login software that is coupled to a network, the server comprising,
a database storing a pre-login time for one or more users, wherein the pre-login time is when a user is to be pre-logged in to a system;
a storage devices for storing initialization data, wherein the initialization data is utilized to pre-login to said system;
a password broker storing user identification and passwords for said one or more users; and
a processor for performing instructions, wherein said processor:
calculates and schedules a pre-login time for said one or more users;
initializes pre-login of said one or more users to the system at the pre-login time utilizing said initialization data, user identification and passwords, the initializing comprising allocating resources of the system to said one or more users to yield one or more pre-login sessions corresponding to the one or more users;
holds the one or more pre-login sessions in an idle mode at least until certain criteria is satisfied, the certain criteria comprising actual log on to the system by the particular user; and
responsive to a particular user of the one or more users logging on to the system, connects the particular user to a corresponding pre-login session of the one or more pre-login sessions, thereby ending the idle mode of the corresponding pre-login session.

12. The system of claim 11, wherein the allocated resources comprise at least one of an operating system (OS), network, application, server, or client.

13. The system of claim 11, wherein the pre-login time is determined by dividing a number of users to be pre-logged in within a selected period of time from a current time by a number of simultaneous logins allowed for said system and adding a set lead time.

14. The system of claim 11, wherein a desired login time for a target user is determined by pattern analysis of past login behavior of said target user.

15. The system of claim 11, wherein a target user or an administrator enters a desired login time for said target user.

16. The system of claim 11, wherein a desired login time for a target user is provided by external source.

17. The system of claim 16, wherein the external source is a staff scheduling system.

18. The system of claim 11, wherein the processor checks if a target user is already logged in to the system prior to pre-login of said user to the system.

19. The system of claim 11, wherein a target user is timed out and logged off of said system if the target user does not login within a set period after said pre-login time.

20. The system of claim 11, wherein a diagnostic tool is coupled to said server, and the diagnostic tool gathers data on prior user login times.

\* \* \* \* \*